May 17, 1966   G. L. PETOFF ETAL   3,251,273
TRACER CONTROL SYSTEM FOR MACHINE TOOLS
Filed July 31, 1963   5 Sheets-Sheet 3

INVENTORS
FREDERICK D. WASSON
GEORGE L. PETOFF
NOEL F. DEPEW

Ronald W Mayes
ATTORNEY

May 17, 1966 G. L. PETOFF ETAL 3,251,273
TRACER CONTROL SYSTEM FOR MACHINE TOOLS
Filed July 31, 1963 5 Sheets-Sheet 4

FIG. 4

INVENTORS
FREDERICK D. WASSON
GEORGE L. PETOFF
BY NOEL F. DEPEW

Ronald W Mayes
ATTORNEY

May 17, 1966

G. L. PETOFF ETAL 3,251,273

TRACER CONTROL SYSTEM FOR MACHINE TOOLS

Filed July 31, 1963

INVENTORS
FREDERICK D. WASSON
GEORGE L. PETOFF
NOEL F. DEPEW

ATTORNEY

United States Patent Office 3,251,273
Patented May 17, 1966

3,251,273
TRACER CONTROL SYSTEM FOR MACHINE TOOLS
George L. Petoff, Seattle, Wash., and Noel F. Depew and Frederick D. Wasson, Wichita, Kans., assignors, by mesne assignments, to Precision Contours, Inc., Wichita, Kans., a corporation of Kansas
Filed July 31, 1963, Ser. No. 298,862
12 Claims. (Cl. 90—13.7)

This invention relates to machine tools and more especially to machine tools used for machining complex shapes. This invention further relates to a position control system for machine tools, and more particularly relates to a control system of the tracer type in which the relative movement of a cutter head and/or work table are in direct response to a contour of a cam, model, pattern, or template.

Heretofore there have been automatic machine tools made for the purpose of reproducing a contoured shape of a cam, model, pattern, or template on a workpiece by machine tools. In many cases the machine tools could be used to perform only one particular function, and being of such a complex and detailed integrated design the machine tools could not be used for any other purpose without a major modification.

Moreover other machines have been made whereby the machine could be adapted to do several kinds of reproduction work; but the changeover from one kind of work to the other had the disadvantages of being costly, complex, intricate, tedious and/or time consuming.

The only alternative to making a special machine tool was to machine low production and/or prototype items on a machine that was manually controlled. This had the disadvantage of being slow, fatiguing, costly, and fraught with the possibility of error.

It is therefore an object of this invention to provide novel tracer means for enabling a machine, particularly a standard machine tool such as a milling machine, to reproduce complex configurations in either two or three dimensions from a model, cam, pattern, or template.

Another object of this invention is the provision of a novel portable control apparatus that can be attached to a machine, particularly a standard machine tool such as a milling machine for enabling the machine to automatically follow guide means such as a cam, model, pattern, and/or template.

Yet another object of this invention is the provision of a novel portable control apparatus, as set forth in the preceding object, that provides accurate machining and provides a machine free of the disadvantages pointed out hereinabove.

Another object of this invention is the provision of a novel portable control apparatus for adapting a machine, particularly a standard machine tool such as a milling machine, to automatically follow a cam, model, pattern and/or template, the control apparatus having a stylus follower for following a contour of a cam, model, pattern, or template and transmitting a signal for controlling a reversible synchro motor that is connectible to a turnable shaft that controls the vertical, transverse, or longitudinal feed of the milling machine.

Another object of this invention is the provision of a novel control apparatus as set forth in the preceding object whereby the stylus follower control circuit and synchro motor drive means are identical for controlling the vertical, transverse, and/or longitudinal feeds of the milling machine.

A still further object of this invention is the provision of portable units, as set forth in the preceding object, that are easily connected to or disconnected from conventional vertical, transverse, and longitudinal feed mechanism of a movable cutter head and/or table of a machine tool such as a milling machine; and wherein the cam, model, pattern, or template necessary for providing the necessary inputs to the stylus follower may be clamped to the movable head or table of the milling machine that is capable of traversing the head or table relative to the other at a uniform or selected rate.

A still further object of this invention is the provision of a novel contour following apparatus that is economical, compact, portable, easily fabricated and installed, and accurate.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Figure 1:
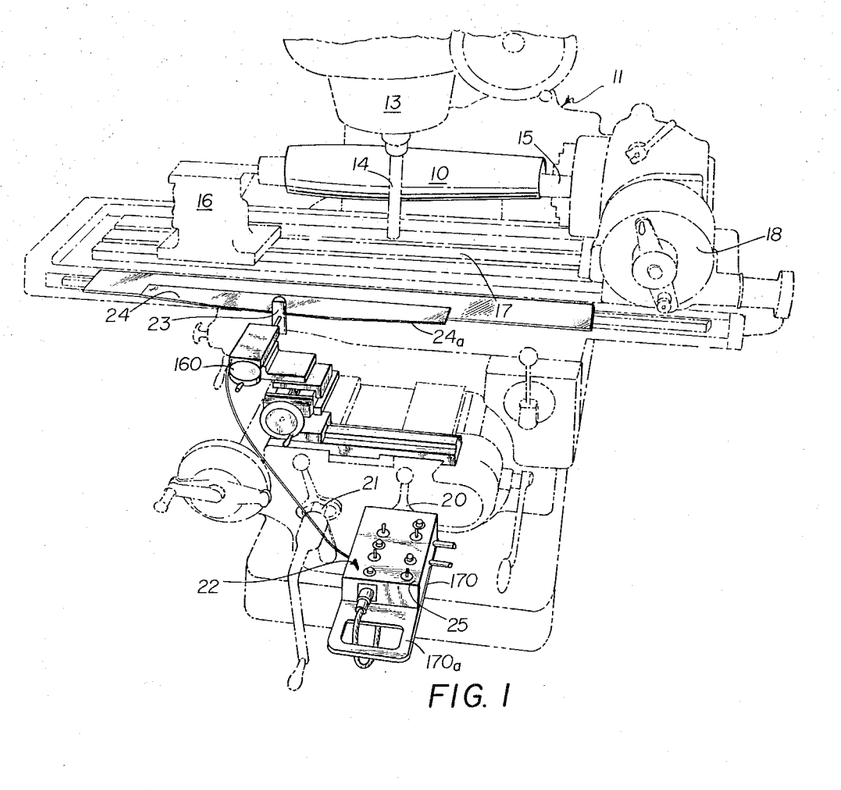
FIG. 1 is a pictorial front view of a milling machine tool having the invention connected to a transverse feed of a table thereof for guiding the table in a transverse direction relative to a milling tool in a fixed head taking tangential cuts on an aircraft windtunnel model, the table being transversely moved in and out in response to signals transmitted from a template fixed to the table that is longitudinally traversing at a uniform rate.
Figure 4:
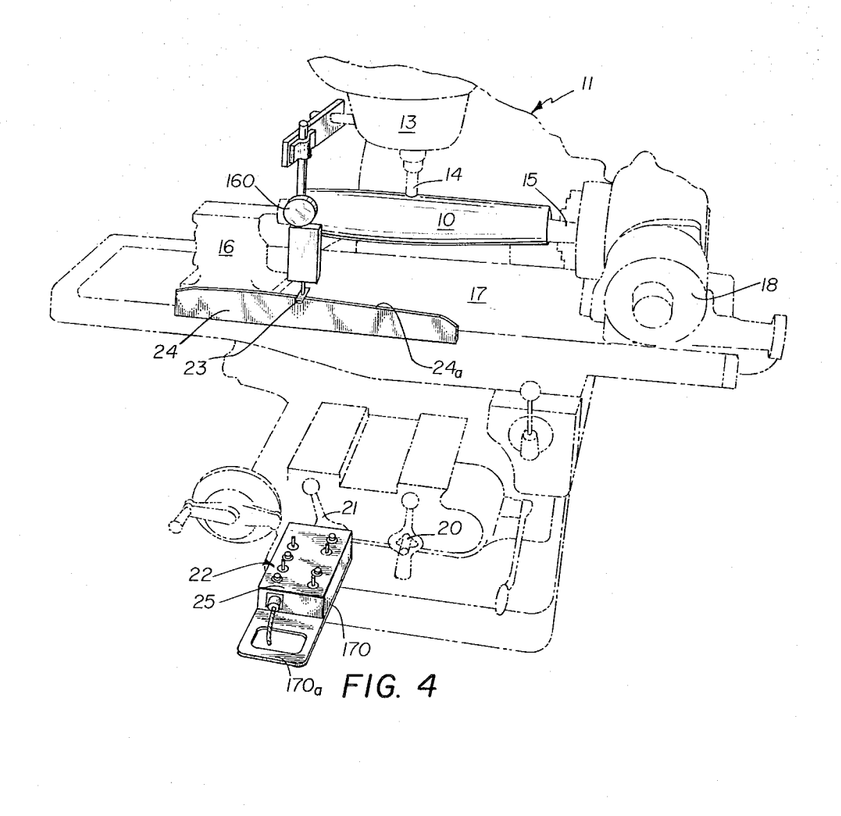
FIG. 4 is a view similar to FIG. 1 except the invention is connected to the vertical feed of a milling machine table and is controlling the depth of cut by an end milling tool in response to a signal picked off from a template fixed to a longitudinally traversing table.
Figure 5:
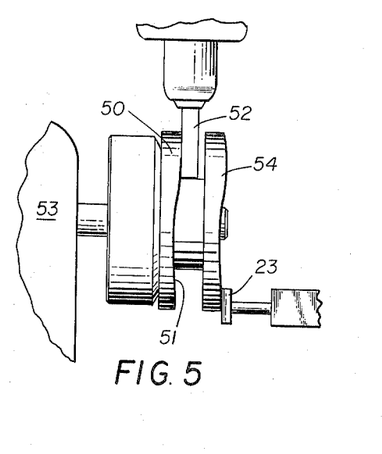
FIG. 5 is an enlarged fragmentary view of a workpiece having a cylindrical cam groove milled in the periphery thereof by an end milling tool, the invention being connected to the transverse feed of the table and the signal being picked off by a stylus from a circular cam.

Referring to FIG. 1, reference numeral 10 indicates a workpiece, which for the purpose of illustration is a windtunnel model of an aircraft fuselage having an aerodynamic area-rule conform near the mid-section thereof. Reference numeral 11 indicates generally a machine tool such as a milling machine having a fixed head 13 carrying a rotating milling cutter 14 that is shown taking a tangential cut on the workpiece 10. The workpiece 10 is fixed to and supported by an indexable head 15 at one end thereof. The other end of the workpiece 10 is fixed to and supported by a tailstock 16 fixed to a bed or table 17 in a conventional manner. The head 15 is angularly positioned by a conventional index head 18 as seen in FIG. 1. The table 17 has a transverse feed for moving it out to the front and in to the rear in a conventional manner. More particularly the table 17 has a movable micrometer input feed 20 for controlling the transverse movement of the table 17 relative to the cutter 14. The table 17 can also be driven longitudinally either manually or connected to an automatic feed mechanism for moving the workpiece 10 longitudinally from right to left or vice versa as seen in FIG. 1. The table 17 has a manual micrometer feed input 21 for adjusting the up and down position of the table 17 relative to the fixed head 13 and the tool 14. Only the rudiments of the machine tool 11 have been described since it is to be understood that other types of machines, particularly milling machines, can be employed. The particular machine 11 shown for illustrative purposes in the drawings, FIGS. 1, 4 and 5, is an end mill made by Kearney & Trecker, of Milwaukee, Wisconsin. Other details of the machine tool 11 can be had by referring to this particular machine.

The tracer apparatus comprises a servo mechanism and a control box therefor, indicated generally by the reference numeral 22, and a follower stylus 23 that feeds a signal via an electrical circuit to a servo mechanism, and more particularly a reversible D.C. electrical servo motor 24, that is mechanically coupled to the transverse feed 20. It will be understood that the transverse input feed 20 is a control knob with a micrometer scale thereon so that the bed can be adjusted in a transverse direction to the nearest one thousandth of an inch. Transmission means, including a gear box, are connected in a conventional manner to the motor 19 and to the knob 20 for transmitting the proper input to the knob 20 from the motor 19. Preferably, the gear box has a step down ratio of 223 to 1. The motor 19, can have a relatively low horsepower rating on the order of one tenth horsepower since very little torque is necessary to drive the gear box and control knob 20.

The follower stylus 23 picks off a signal from a guide means such as a template 24 fixed to a front edge of the table 17. The contour of an edge 24a of the template 24 is preferably identical to the contour desired in the workpiece along the plane of a tangential cut by the cutter 14. As the workpiece 10 is indexed through an angular increment from the portion shown in FIG. 1 another template will replace the template 24 unless, of course, it is desired for the workpiece 10 to have a body of revolution in accordance with the contour of the edge 24a of the template 24. It will be understood that in lieu of the template 24, other guide means such as a cam, a pattern, or a model can be mounted on the table 17. If a master model or pattern is used, then it must be indexed in much the same manner as the workpiece 10 is indexed.

Figure 2:
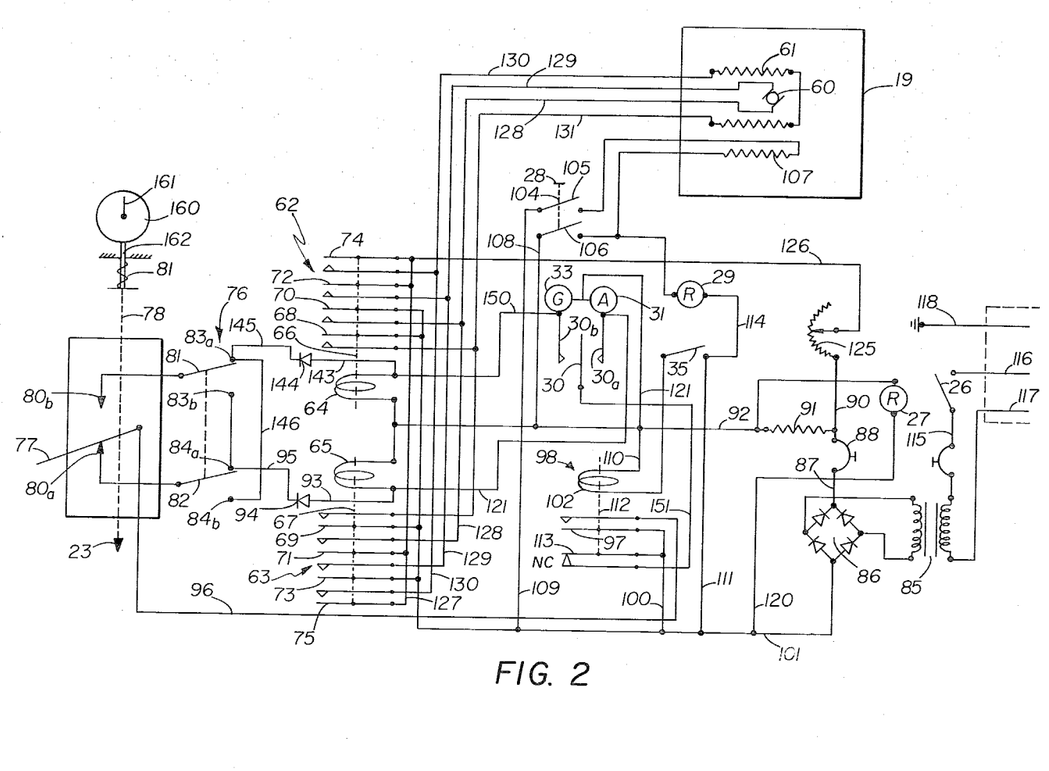
FIG. 2 is a schematic electrical-mechanical diagram of the control apparatus.
Figure 3:
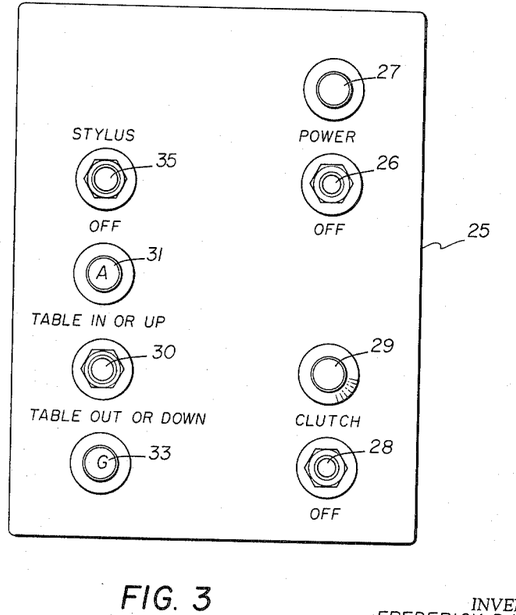
FIG. 3 is a top plan view of a control panel.

The control box 22 has a control panel 25, FIGS. 1 and 3. A push-pull single-pole, single-throw switch 26 controls the power to the circuit controlling the motor 19. A red light 27 is energized when the power is on. A push-pull double-pole, single-throw switch 28 controls an electromagnetic clutch of conventional configuration, FIG. 2, for engaging and disengaging the drive of the transmission means to the knob 20. A red light 29 is energized when the clutch switch 29 is on. A push-pull single-pole, double-throw switch 30 is closed with a contact 30a when it is desired for the table 17 to be traversed inwardly in a transverse direction or upwardly in a vertical direction independently of the stylus 23 depending upon whether the control box 22 is respectively connected to the transverse feed or vertical feed of the table 17. An amber light 31 is energized when the switch 30 is closed with the contact 30a. The switch 30 is closed with a contact 30b when it is desired for the table 17 to be traversed outwardly or downwardly independently of the stylus 23 depending on whether the control box 22 is connected to the transverse or vertical feed of the table 17, respectively. A green light 33 is energized when the switch 30 is closed with the contact 30b. A stylus switch 35 can be closed to permit the motor 19 to be controlled by the stylus 23.

During normal operation utilizing the stylus 23, the power switch 26, the clutch switch 28 and the stylus switch 35 are closed. However if it is desired to operate the motor 19 independently of the stylus 23, the stylus switch 35 is opened and the switch 30 can be closed with either the contact 30a or 30b, but not both, for manual control of the table movement in or up, or out or down.

As pointed out hereinabove, FIG. 1 shows the application of the invention to the transverse feed of the table 17 for taking longitudinal tangential cuts on the workpiece 10. However, it will be understood that the invention is also applicable to the vertical and longitudinal feeds of the tabel 17. The application to the vertical feed of the table 17 is illustrated in FIG. 4, wherein the control box 22 is connected to the vertical feed 21 of the table 17. For purposes of simplicity, a similar workpiece 10 and a similar template 24 are retained. However the template 24 is fixed in an upright position to the table 17. In lieu of a tangential cut on the workpiece 10, an end milling cut is made by the cutting tool 14 as the table 17 is moved up or down. The tool 14 is a radially or diametrically downwardly extending end mill type of cutting tool. The up and down movement of the table 17 is controlled by the signal picked off by the stylus 23 from the edge 24a of the upright template 24 as the table 17 longitudinally traverses at a selected rate of feed. The stylus 23 instead of being fixed to an immovable pedestal portion of the machine 11, is fixed in a suitable manner to the fixed head 13 of the machine so as to engage the upright edge 24a of the template 24.

FIG. 5 illustrates another application of the invention wherein a cylindrical workpiece 50 has a circular or annular cam surface 51 being milled by an end mill 52. The workpiece 50 is chucked or otherwise connected to a conventional mechanism 53 for supporting and turning the workpiece 50 at a selected rate, as controlled from the indexing head 18. A circular or annular cam or template 54 is fixed to the workpiece 50 for being supported and turned thereby. The stylus 23 engages the cam track of the circular template 54 as a point diametrically opposite to the point of engagement of the end mill 52. The control box 22 is connected to the transverse feed 20 of the table 17 and, responsive to the signal of the stylus 23, drives the table 17 in or out. Preferably, as the cam surface urges the stylus 23 outwardly, the motor 19 of the control unit 22 drives the table 17 inwardly and vice versa. It will be understood that the table can be driven transversely outwardly as the stylus 23 is caused to be moved inwardly since this is but a matter of choice, as will be described.

*Control box*

Referring to FIG. 2, the polarity of rotor windings on an armature 60 and the stator windings 61 of the motor 19 are controlled by a pair of opposed normal reverse and forward motor control relays indicated generally by reference numerals 62 and 63. The reverse motor control relay 62 has a coil 64 controlling a movable armature 66 connected to four movable, normally open contacts 68, 70, 72, 74. The normal forward motor control relay 63 has a coil 65 controlling a movable armature 67 connected to four movable, normally open contacts 69, 71, 73, 75.

The polarity or direction that the shaft of the servo motor 19 is driven in response to a particular direction of movement of the stylus 23 is controlled by the position of a manually operated double-pole, double-throw type reversing switch, indicated generally by the reference numeral 76.

The stylus 23 operates a stylus direction sensing switch 77. The switch 77 is attached to the stylus 23 via a mechanical linkage 78. The switch 77 closes with a contact 80a, as seen in FIG. 2, when the stylus 23 rides or moves inwardly in the direction of the arrow A on the template portion 24a as urged by a spring 81 attached to the linkage 78. Conversely, the stylus 23 moves the switch 77 into engagement with the contact 80b when the stylus 23 is urged in a direction opposite to the arrow A.

For the purpose of describing an operating mode of this invention switches 81, 82 of the reversing switch 76 are engaged with contacts 83a, 84a, whereby the coil 65 of the relay 63 is put in circuit and energized. If the switches 81, 82 of the reversing switch 76 were closed with contacts 83b, 84b, then the coil 64 of the reversing relay 62 would be put in circuit when the stylus moved inwardly in the direction of the arrow A. A 115 volt alternating current, v. A.C., power supply is supplied to a power transformer 85 that has a full wave, single phase rectifier diode bridge 86 connected across a secondary winding thereof. A positive wave rectified voltage is passed by the rectifier 86 through a line 87, a push-pull circuit breaker 88, a line 90, a resistance 91, a line 92, the relay coil 65, a line 93, a diode 94, a line 95, the contact 84a, the switch 82, the contact 80a, the switch 77, a line 96, a now closed contact 97, and through lines 100 and 101 to the backside of the full wave rectifier 86. The contact 97 is normally open and is part of a stylus relay indicated generally by the reference numeral 98. The stylus relay 98 comprises a coil 102 connected across the lines 92 and 101 and energized when the stylus switch 35 is closed.

The stylus switch 35 is preferably closed the same time that the clutch switch 28 is closed. Switches 105, 106 are ganged via a mechanical linkage 104 and are controlled by the clutch switch 28 on the control panel 25, FIG. 3. The closing of the switches 105 and 106 permits the clutch to be engaged when a winding 107 thereof is energized. The winding 107 is connected across the lines 92 and 101 via lines 108, 109. The lines 108, 109 have the switches 105, 106, respectively connected therein.

The coil 102 of the relay 98 is connected to the line 92 via a line 110 and to the line 101 via a line 111. The stylus switch 35 is in the line 111. The coil 102 controls an armature or mechanical linkage 112 normally biased outwardly in a conventional manner so that the switch 97 is normally open and a switch 113 is normally closed thereby. When the coil 102 is energized on the closing of the stylus switch 35, the switch 97 is closed and the switch 113 is opened by the armature 112. The switch 113 is used to permit manual operation of the motor 19 by operation of the switch 30 on the control panel 25 and thus avoiding the use of the stylus 23.

The red clutch light 29 is connected in a line 114 having one end connected to the line 101 via the line 111 and the other end connected to the line 92 via the line 108 and the switch 106.

The red power light 27 is energized when the power switch 26 is closed in a line 115 for connecting the transformer 85 across the 115 v. A.C. power lines 116, 117 of a three phase power line that also has a grounded line 118. The red power light 27 is in a line 120 connected across the lines 92 and 101.

Inasmuch as the stylus 23 is being urged inwardly in the direction of arrow A so that the motor 19 is being driven in its normal forward direction because the switch 77 is closed with the contact 80a and the reversing switch 76 is in normal mode position, the table 17 of FIG. 1 is moving inwardly in a transverse direction, or alternatively the table of FIG. 3 is moving upwardly. Accordingly, the amber light 31 is energized. The light 31 is in a line 121 connected at one end to the line 92 and at the other end to the line 93 and the coil 65 so that the amber light 31 is energized when the coil 65 of the normal forward direction motor control relay 63 is energized.

When the coil 65 of the relay 63 is energized, the armature 67 moves the switches 69, 71, 73 and 75 to a closed position. The closing of the relay switches 71 and 73 puts the winding of the armature 60 in circuit across the line 101 and the line 90.

More particularly, the signal travels in FIG. 2 from the full wave rectifier 86 via the circuit breaker 88, the line 90, a motor speed regulating field rheostat 125, a motor speed control power line 126, a power distributor line 127, the closed relay switch 71, a motor armature winding line 128, the winding of the armature 60, a motor armature winding line 129, the closed relay switch 73, and via the line 101 to the backside of the rectifier 86.

The simultaneous closing of the relay switches 69 and 75 puts the stator windings 61 of the motor in circuit across the lines 90 and 101. More particularly, the closed relay switch 75 is connected into the line 127 and electricity is conducted thereby through a line 130, the motor stator windings 61, a line 131, the closed relay contact 69, and the line 101 to the backside of the rectifier 86.

When the stylus 23 is forced by the conform of the cam edge 24a of the template 24 rearwardly so that the switch 77 is forced out of connection with the contact 80a and into electrical connection with a contact 80b, and the reverse motor control relay 62 is put into circuit. Accordingly, the drive of the motor 19 is reversed because the polarity of the power in the armature or rotor winding lines 130, 131 is reversed. However the polarity of the power in the stator windings 61 remains the same.

More particularly, the energization of the relay 62 permits an electrical signal to travel from the power line 92 through the reverse relay coil 64, a stylus line 143, a diode 144 that passes plus wave signals, a stylus line 145, the contact 83a, the switch 81, the contact 80b, the stylus switch 77, the line 96, the switch 97 of the stylus relay 98, the line 100, the line 101, and to the backside of the rectifier 86.

When the coil 64 of the motor relay 62 is energized the contacts 66, 68, 70, and 72 are closed. The closing of the contracts 70 and 72 permits an electrical signal to flow from the motor speed control power line 126 to energize the rotor winding of the armature 60 in a reverse direction via a circuit comprising the line 126, the line 127, the closed relay contact 72, the line 129, the winding of the armature 60, the line 128, the closed relay contact 70, and the line 101 back to the backside of the rectifier 86.

The closing of the contacts 74 and 68 permits an electrical signal to flow from the motor speed control power line 126 to energize the motor stator windings 61 in a reverse direction via a circuit comprising the line 126, the closed relay contact 74, the line 130, the windings 61, the line 131, the closed relay contact 68, and the line 101 to the backside of the rectifier 86.

When the motor 19 is reversed, the table is caused to be moved transversely outwards in FIG. 1, or down in FIG. 4. The operator is kept informed of the direction movement of the table because the green light 31 is energized. The green light 31 receives an electrical signal from the line 92 via a line 121, a line 150, the line 143, the diode 145, the contact 83a, the switch 81, the contact 80b, the switch 77, the line 96, the closed switch 97, the line 100, and the line 101 to the backside of the rectifier 86.

*Manual operation*

A feature of this invention is that the table can be operated independently of the stylus by the motor 19 by manipulation of the switch 30. The stylus switch 35 must be open.

When it is desired to move the table in or up, the switch 30 is closed with the contact 30a. This causes the coil 64 of the relay 62 to be put in circuit across the line 92 and 101. Power from the line 92 is supplied to the coil 64, a line 150, the contact 30a, the closed switch 30, a line 151, a normally closed switch 113 of the de-energized stylus relay 98, and a line 100 to the line 101.

The motor 19 is driven in a reverse direction in the manner described when the relay 62 is put in circuit, assuming the reversing switch 76 remains in the described position, FIG. 2.

The moving the table 17 out or down, the switch 30 is closed with the contact 30b. This puts the normal forward motor control relay 63 into circuit. Power from the line 92 is supplied to the coil 65, a line 121, the contact 30b, the closed switch 30, the line 151, the switch 113, and the line 100, to the line 101.

Dial indicator

Another feature of this invention is the provision of a conventional dial indicator 160 having a pointer 161 adapted to move relative to an adjustable dial face indicating the axial adjustment or deflection of a feeler shaft 162. The shaft 162 is biased outwardly by a resilient spring, not shown, contained within the indicator 160. Preferably the feeler shaft 162 is axially connected to the stylus 23. The contacts 80a and 80b of the stylus operated switch 77 are spaced a very short distance apart so that the stylus is never axially deflected in either direction more than one thousandth of an inch. In actual practice the dial indicator pointer 161 preferably stays within ±0.0005 inch of zero. Accordingly, the workpieces can be and are machined to very close tolerances.

Support bracket

Figure 6:
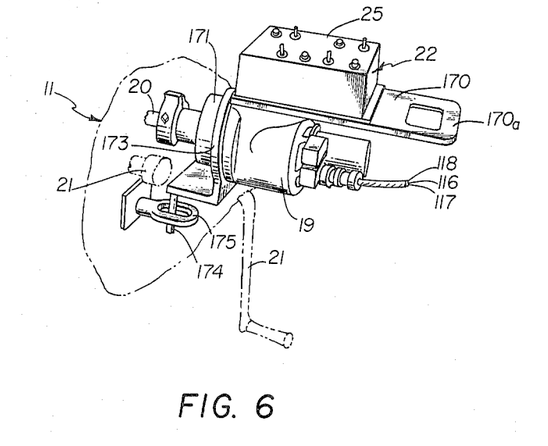
FIG. 6 is a fragmentary pictorial view of the portable control apparatus connected to a transverse feed shaft end of the milling machine tool.

Referring to FIG. 6, the portable tracer unit comprising the motor 19, control box 22, and control panel 25 are preferably connected as a portable unit directly to and supported by the transverse feed 20. If desired a unit can be connected to each of the vertical, transverse, and longitudinal feeds of the machine tool for three dimensional control.

A preferred form of support bracket comprises an horizontal plate 170 having the control box 22 and the control panel 25 fixed to the topside thereof. The housing and mounting brackets of the motor 19 are fixed to the bottomside of the plate 170. A drive transmission mechanism 171, including the step-down gear box and the electromagnetic clutch, is axially aligned and connected by a conventional hollow tube with a set screw over the transverse feed knob 20, for example. The plate 170 preferably has an opening in the outer end thereof for forming a carrying handle 170a.

The weight of the entire portable tracer unit is carried by the knob 20. Although very little torque is generated by the motor 19, another plate 172 has a vertical yoke 173 fixed to the front edge of the plate 170 and extended around the drive transmission mechanism 171. A downwardly depending portion 174 of the yoke 173 is received in an eyelet 175 fixed to the front of the machine tool in a conventional manner.

It will be understood that this invention can be modified to adapt it to various circumstances and conditions, and it is accordingly desired to comprehend within the purview of this invention such modifications as may be considered to fall within the scope of the appended claims.

What is claimed is:

1. A positioning control system for a machine tool having a cutter head and a work table movable relative to each other and comprising, a tracer stylus, means urging said stylus into continuous engagement with a profile of a template, a reversible constant speed electrical motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, one of said motor control relay means being in circuit and said motor being energized when said tracer stylus switch means are closed and said motor being deenergized, both of said motor control relay means being out of circuit when said tracer stylus switch means are open, and drive transmission means drivingly connected to said motor and adapted to be connected to a feed input of the machine tool in such a manner as to provide a constant speed input to the same and to control the relative movement of the cutter and the work table in a selected direction along only one predetermined axis of three mutually perpendicular axes.

2. A positioning control system as set forth in claim 1, wherein said drive transmission means includes an electrically operated clutch, and said clutch being deenergized and disengaged when both of said motor control relay means are out of circuit.

3. A positioning control system as set forth in claim 1, wherein said drive transmission means includes a gear box.

4. A positioning control system for a machine tool having a cutter head and a work table movable relative to each other and comprising, a tracer stylus, means urging said stylus into continuous engagement with a profile of a template, a reversible electrical motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, said motor being deenergized when said tracer stylus switch means are open, drive transmission means drivingly connected to said motor and adapted to be connected to a manual feed input of the machine tool in such a manner as to control the relative feed of the cutter and the work table in a selected direction along only one predetermined axis of three mutually perpendicular axes, and reversing switch means connected to said first and second motor control relay means in such a manner that said first motor control relay means can control the drive of said motor in the reverse direction and said second motor control relay means can control the drive of said motor in a forward direction.

5. A positioning control system for a machine tool having a cutter head and a work table movable relative to each other and comprising, a tracer stylus, means urging said stylus into continuous engagement with a profile of a template, a reversible electrical motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, said motor being deenergized and both of said motor control relay means being out of circuit when said tracer stylus switch means are open, drive transmission means drivingly connected to said motor and adapted to be connected to the machine tool in such a manner as to control the relative movement of the cutter and the work table in a selected direction along only one predetermined axis of three mutually perpendicular axes, and stylus switch means for connecting said tracer stylus switch means in circuit when it is desired for said tracer stylus to automatically operate the drive of said motor.

6. A positioning control system as set forth in claim 5, panel light means for indicating when either of said first and second motor control relay means are in circuit.

7. A positioning control system for a machine tool having a cutter head and a work table movable relative to each other and comprising, a tracer stylus, means urging said stylus into continuous engagement with a profile of a template, a reversible electrical motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, both of said motor control relay means being out of circuit and said motor being deenergized when said tracer stylus switch means are open, drive transmission means drivingly connected to said motor and adapted to be connected to the machine tool in such a manner as to control the relative movement of the cutter and the work table in a selected direction along only one predetermined axis of three mutually perpendicular axes, and manually operated switch means for bypassing said tracer stylus switch means and selectively connecting either of said first and second motor control relay means in circuits.

8. A positioning control system as set forth in claim 7, first panel light means for indicating when said first motor control relay means are in circuit, and second panel light means for indicating when said second motor control relay means are in circuit.

9. A positioning control system for a machine tool having a cutter head and a work table movable relative to each other and comprising, a tracer stylus, means urging said stylus into continuous engagement with a profile of a template, a reversible electrical motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, both of said motor control relay means and said motor being deenergized when said tracer stylus switch means are open, drive transmission means drivingly connected to said motor and adapted to be connected to the machine tool in such a manner as to provide a constant speed feed input and to control the relative movement of the cutter and the work table in a selected direction along only one axis of three mutually perpendicular axes, and dial indicator means connected to said tracer stylus for indicating within one-thousandth of an inch the accuracy with which the positioning control system and the machine tool moving the cutter head and the work table relative to each other in response to signals transmitted to said tracer stylus by the template.

10. A positioning control system for a machine tool having a cutter head and a work table movable relative to each other and comprising, a tracer stylus, means urging said stylus into continuous engagement with a profile of a template, a reversible electric motor, first motor control relay means operatively connected to said motor and adapted to be connected to an electrical power source for controlling the drive of said motor in a forward direction, second motor control relay means operatively connected to said motor and adapted to be connected to the electrical power source for controlling the drive of said motor in a reverse direction, switch means connected to and controlled by said tracer stylus for connecting said first motor control relay means in circuit when said tracer stylus is moved a predetermined distance in one axial direction by the template and for connecting said second motor control relay means in circuit when said tracer stylus is moved a predetermined distance in an opposite axial direction by the template, drive transmission means including an electrically operated clutch and a gear box drivingly connected to said motor and adapted to be connected to the machine tool in such a manner as to control the relative movement of the cutter and the work table in a selected direction along only one predetermined axis of three mutually perpendicular axes, control panel means, stylus switch means in said control panel means for connecting said tracer stylus switch means in circuit when it is desired for said tracer stylus to automatically operate the drive of said motor, said motor and both of said motor control relay means and said clutch being deenergized when said tracer stylus switch means are open, said motor and said clutch being energized at the same time and being deenergized at the same time, manually operated switch means in said control panel means for bypassing said tracer stylus switch means and selectively connecting either of said first and second motor control relay means in circuit, first panel light means in said control panel means for being energized when said first motor control relay means are put in circuit by said tracer stylus switch means or said manually operated switch means, second panel light means in said control panel means for being energized when said second motor control relay means are put in circuit by said tracer stylus switch means or said manually operated switch means, clutch switch means in said control panel means for controlling the engagement of said electrically operated clutch in said drive transmission means, third panel light means in said control panel means for being energized when said electrically operated clutch is engaged, electrical power switch means in said control panel means for controlling the flow of electricity from a power source, and fourth panel light means in said control panel means for being energized when said power switch means is closed.

11. A positioning control system for a machine tool having a cutter head and a work table movable relative to each other and comprising, stylus means adapted to be urged into continuous engagement with guide means, reversible motor means, first motor control relay means operatively connected to said motor means for controlling the drive of said motor means in a forward direction, second motor control relay means operatively connected to said motor means for controlling the drive of said motor in a reverse direction, means connected to and controlled by said stylus means for actuating said first motor control relay means when said stylus means is moved a predetermined distance in one axial direction by the guide means and for actuating said second motor control relay means when said stylus means is moved a predetermined distance in an opposite axial direction by the guide means, said motor means being deenergized while said stylus means are being moved through said predetermined distance, and drive transmission means drivingly connected to said motor means and adapted to be connected to the machine tool in such a manner as to control the relative movement of the cutter and the work table in a selected direction along only one axis of three mutually perpendicular axes.

12. A positioning control system for a machine tool having a cutter head and a work table movable relative to each other and comprising, stylus means adapted to be urged into continuous engagement with guide means, reversible drive means adapted to be connected to the machine tool in such a manner as to control the relative feed of the cutter and the work table in a selected direction only one axis of three mutually prependicular axes, first drive control relay means operatively connected to said drive means controlling the drive of said drive means in a forward direction, second drive control relay means operatively connected to said drive means controlling the drive of said drive means in a reverse direction, and means connected to and controlled by said stylus means for actuating said first drive control relay means when said stylus means is moved a predetermined distance in one axial direction by the guide means and for actuating said second drive control relay means when said stylus means is moved a predetermined distance in an opposite axial direction by the guide means, and said drive means and said first and second drive control means being disengaged while said stylus controlled means are being moved through said predetermined distance.

References Cited by the Examiner
UNITED STATES PATENTS

| | | |
|---|---|---|
| 1,998,939 | 4/1935 | Mittag. |
| 2,076,865 | 4/1937 | Romaine ____________ 90—62 |
| 2,138,208 | 11/1938 | Rosen ____________ 90—13.5 |
| 2,249,413 | 7/1941 | Bechtle et al. ________ 90—62 X |
| 2,301,719 | 11/1942 | Turchan et al. _______ 90—13.5 |
| 2,314,019 | 3/1943 | Shaw ____________ 90—13.5 X |
| 2,334,956 | 11/1943 | Ridgway ____________ 90—13.5 |
| 2,351,626 | 6/1944 | Muller ____________ 90—13.5 |
| 2,412,339 | 12/1946 | Jeffreys ____________ 90—13.5 |
| 2,493,828 | 1/1950 | Parsons ____________ 90—13.5 |
| 2,511,956 | 6/1950 | Wetzel ____________ 90—13.5 |
| 2,841,053 | 7/1958 | Horlacher ____________ 90—13.5 |
| 2,946,265 | 7/1960 | Fuldner et al. ________ 90—13.5 |
| 2,973,695 | 3/1961 | Schmid ____________ 90—13.5 |

WILLIAM W. DYER, JR., *Primary Examiner.*

LEON PEAR, ANDREW R. JUHASZ, *Examiners.*

G. A. DOST, *Assistant Examiner.*